United States Patent
Venkataraman et al.

(10) Patent No.: US 12,302,455 B2
(45) Date of Patent: May 13, 2025

(54) RADIO CAPABILITY UPDATE PROCEDURE OVER NON-3GPP ACCESS

(71) Applicant: Apple Inc., Cupertino, CA (US)

(72) Inventors: Vijay Venkataraman, San Jose, CA (US); Dawei Zhang, Saratoga, CA (US); Haijing Hu, Los Gatos, CA (US); Krisztian Kiss, Rancho Santa Fe, CA (US); Lakshmi N. Kavuri, San Jose, CA (US); Sridhar Prakasam, Fremont, CA (US); Srinivasan Nimmala, San Jose, CA (US); Utkarsh Kumar, San Jose, CA (US); Yifan Zhu, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 339 days.

(21) Appl. No.: 17/773,521

(22) PCT Filed: Jan. 3, 2020

(86) PCT No.: PCT/CN2020/070285
§ 371 (c)(1),
(2) Date: Apr. 29, 2022

(87) PCT Pub. No.: WO2021/134787
PCT Pub. Date: Jul. 8, 2021

(65) Prior Publication Data
US 2022/0386108 A1    Dec. 1, 2022

(51) Int. Cl.
*H04W 8/24* (2009.01)
*H04W 48/08* (2009.01)
*H04W 76/16* (2018.01)

(52) U.S. Cl.
CPC ............. *H04W 8/24* (2013.01); *H04W 48/08* (2013.01); *H04W 76/16* (2018.02)

(58) Field of Classification Search
CPC ....... H04W 76/16; H04W 8/24; H04W 76/15; H04W 48/08; H04W 60/005; H04W 88/06; Y02D 30/70
See application file for complete search history.

(56) References Cited

U.S. PATENT DOCUMENTS

2019/0007992 A1    1/2019   Kim et al.
2019/0174449 A1*   6/2019   Shan ..................... H04W 60/04
                            (Continued)

FOREIGN PATENT DOCUMENTS

| CN | 109691059 A | 4/2019 |
| CN | 109964498   | 7/2019 |
| CN | 110249667   | 9/2019 |

OTHER PUBLICATIONS

International Search Report and Written Opinion for PCT/CN2020/070285; 9 pages; Sep. 28, 2020.
(Continued)

*Primary Examiner* — Congvan Tran
(74) *Attorney, Agent, or Firm* — Kowert, Hood, Munyon, Rankin & Goetzel, P.C.

(57) ABSTRACT

Embodiments are presented herein of apparatuses, systems, and methods for a user equipment device (UE) and/or cellular network to perform to perform capability updates. Under at least some circumstances, the UE may use a non-cellular (e.g., non-3GPP) access to transmit updated capability information to a cellular network. Elements of the core of the cellular network may provide an identifier corresponding to the updated capability information to the UE for use in future registrations with the cellular network. Further, the core network may provide the updated capability information to a cellular radio access network associated the cellular network. The UE and the cellular network may communicate according to the updated capability.

19 Claims, 8 Drawing Sheets

(56) References Cited

U.S. PATENT DOCUMENTS

| | | |
|---|---|---|
| 2019/0306251 A1 | 10/2019 | Talebi Fard et al. |
| 2019/0313239 A1 | 10/2019 | Horn |
| 2019/0394833 A1* | 12/2019 | Talebi Fard ........ H04W 68/005 |
| 2020/0163145 A1* | 5/2020 | Park ..................... H04W 76/18 |

OTHER PUBLICATIONS

"3rd Generation Partnership Project; Technical Specification Group Services and System Aspects; Architecture enhancements for non-3GPP accesses (Release 16)"; 3GPP TS 23.402 V16.0.0; 314 pages; Jun. 2019.
Extended European Search Report for EP Patent Application No. 20908447.4; Jul. 31, 2023.
Apple Ltd. "Access type selection for selecting paging or NAS Notification for downlink user data pending over 3GPP access"; SA WG2 Meeting #127bis S2-185359; May 28, 2018.
Nokia et al. "UE configuration parameters update in the Registration Accept"; SA WG2 Meeting #134 S2-1907914; Jun. 24, 2019.
Huawei et al. "Addition of UE radio capability information update"; 3GPP TSG-CT WG1 Meeting #112 C1-185099; Aug. 20, 2018.
Apple "UE Radio Capability update procedure over non-3GPP access"; SA WG2 Meeting #136-AH S2-2000755; Jan. 13, 2020.
Office Action for Chinese Application No. 202080080156.9; Nov. 5, 2024.

* cited by examiner

RADIO CAPABILITY UPDATE PROCEDURE OVER NON-3GPP ACCESS

PRIORITY CLAIM

This application is a national phase entry of PCT Application No. PCT/CN2020/070285, entitled "Radio capability update procedure over non-3GPP access," filed Jan. 3, 2020, which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

TECHNICAL FIELD

The present application relates to wireless devices, and more particularly to apparatuses, systems, and methods for updating radio capability.

DESCRIPTION OF THE RELATED ART

Wireless communication systems are rapidly growing in usage. Wireless devices, particularly wireless user equipment devices (UEs), have become widespread. Additionally, there are a variety of applications (or apps) hosted on UEs that perform or depend on wireless communication, such as applications that provide messaging, email, browsing, video streaming, short video, voice streaming, real-time gaming, or various other online services.

In some instances, a UE may update its capability information. Providing updated capability information to a network may require significant signaling, energy use, and/or delay. Accordingly, improvements in the field may be desired.

SUMMARY

Techniques, apparatuses, systems, and methods are disclosed for a user equipment device (UE) and cellular network to perform a capability update, e.g., in new radio (NR). The UE may detect a trigger for providing a capability update to a cellular network. The UE may determine one or more conditions related to its communication status for example: connection management and/or radio resource control status (e.g., connected, idle, inactive, etc.) with regards to either or both of a 3GPP and/or non-3GPP access, types of ongoing communication activity (e.g., if any procedure is critical), etc. Based on the conditions, the UE may select a method for providing the capability update. Among various possibilities, the method may include transmitting the capability update over a non-3GPP access, under certain conditions. A 3GPP access may be used in other conditions. The method may include a registration procedure, non-access stratum message.

In response to a capability update received over a non-3GPP access, a cellular network may update a capability identifier of the UE, and may provide the updated identifier to the UE over a non-3GP access. Further, the cellular network (e.g., an AMF or other core network function) may provide updated capability information of the to one or more base stations or other elements of a radio access network of the cellular network. The core network may determine timing of such actions based on conditions of the UE.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the disclosed embodiments can be obtained when the following detailed description is considered in conjunction with the following drawings, in which.

Figure 1:
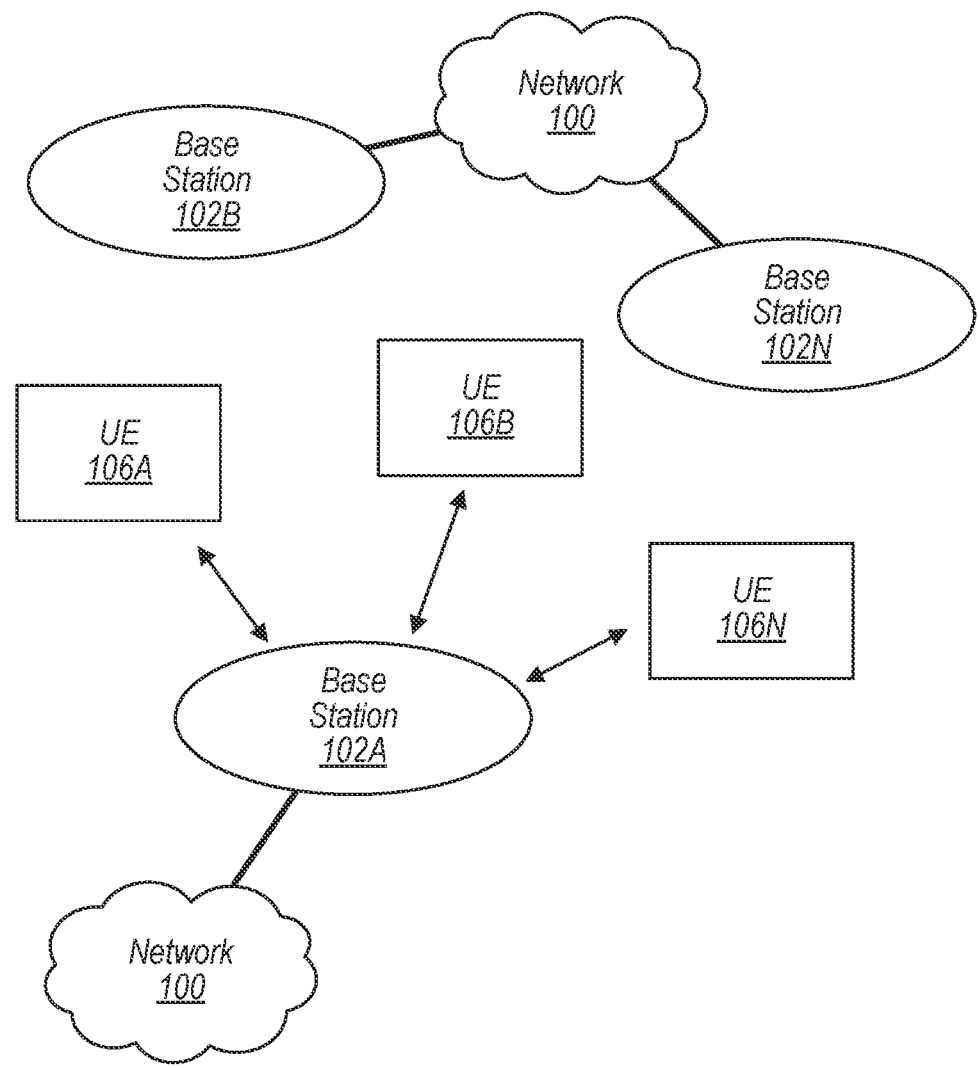
FIG. 1 illustrates an example wireless communication system, according to some embodiments.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Acronyms

The following acronyms may be used in the present Patent Application:

UE: User Equipment
BS: Base Station
gNB: gNodeB (Base Station)
NR: new radio
LTE: Long Term Evolution
VoLTE: voice over LTE
UMTS: Universal Mobile Telecommunications System
RAT: Radio Access Technology
RAN: Radio Access Network
E-UTRAN: Evolved UMTS Terrestrial RAN
CN: Core Network
EPC: Evolved Packet Core
MME: Mobile Management Entity HSS: Home Subscriber Server
SGW: Serving Gateway
PS: Packet-Switched
CS: Circuit-Switched
EPS: Evolved Packet-Switched System
RRC: Radio Resource Control
IE: Information Element
UL: uplink
DL: downlink
DCI: downlink control information
RS: reference signal
PLMN: Public Land Mobile Network
Terms The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer system devices which performs wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 2:
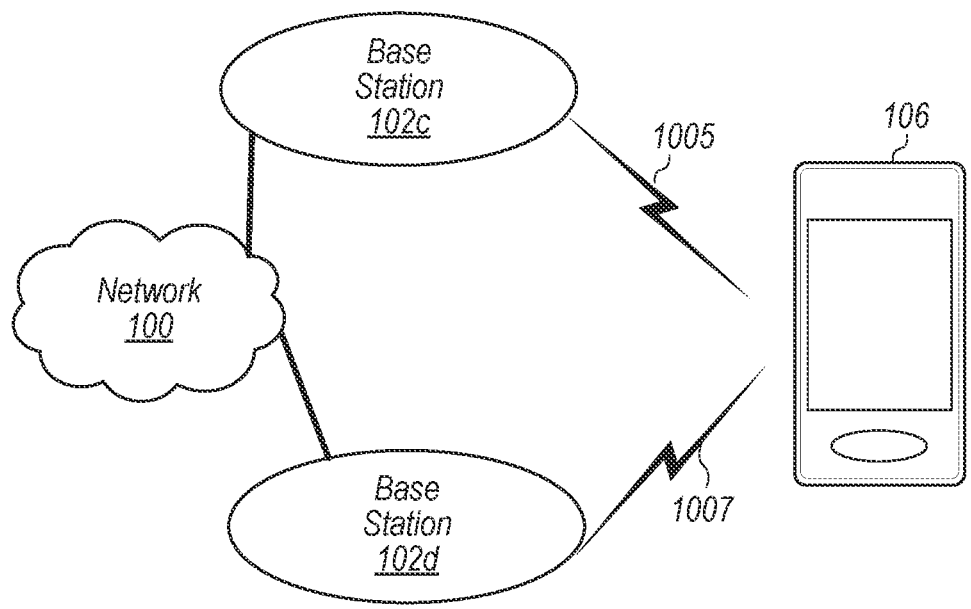
FIG. 2 illustrates base stations (BS) in communication with a user equipment (UE) device, according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102 which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102 may be a base transceiver station (BTS) or cell site (a "cellular base station"), and may include hardware that enables wireless communication with the UEs 106A through 106N.

The communication area (or coverage area) of the base station may be referred to as a "cell." The base station 102 and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102 is implemented in the context of LTE, it may alternately be referred to as an 'eNodeB' or 'eNB'. Note that if the base station 102 is implemented in the context of 5G NR, it may alternately be referred to as 'gNodeB' or 'gNB'.

As shown, the base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the user devices and/or between the user devices and the network 100. In particular, the cellular base station 102 may provide UEs 106 with various telecommunication capabilities, such as voice, SMS and/or data services.

Base station 102 and other similar base stations operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102 may act as a "serving cell" for UEs 106A-N as illustrated in FIG. 1, each UE 106 may also be capable of receiving signals from (and possibly within communication range of) one or more other cells (which might be provided by other base stations 102B-N), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. Other configurations are also possible.

In some embodiments, base station 102 may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

FIG. 2 illustrates a UE 106 in communication with a PLMN 100, according to some embodiments. As shown, the UE 106 may communicate with a BS 102*c* via an access 1005. Access 1005 may be a 3GPP access, e.g., operating according to a cellular RAT. The UE 106 may communicate with a BS 102*d* via an access 1007. Access 1007 may be a non-3GPP access, e.g., operating according to a non-cellular RAT such as WLAN. In some embodiments, BS 102*c* and BS 102*d* may be collocated, and/or may be the same BS 102. In other words, a single BS 102 may provide both a 3GPP access 1005 and a non-3GPP access 1007, according to some embodiments. Each of the BS 102*s* (e.g., 102*c* and 102*d*) may communicate with network 100, e.g., a 5G core network. At any given time, the UE may communicate with the core network 100 of the PLMN via either or both of accesses 1005 and/or 1007. The UE may provide capability updates to the UE via either or both of accesses 1005 and/or 1007.

The network 100 may also include any number of core network elements that are not illustrated in FIG. 2. For example, the network 100 may include an AMF, which may provide services such as maintaining information about capabilities of the UE 106. Further, the non-3GPP access 1007 may include a N3IWF, e.g., in communication with the BS 102*d* and the AMF and/or other network elements. Moreover, any of the elements of NGC 606 and/or EPC 600 may be included.

The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for multiple-input, multiple-output or "MIMO") for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include any number of antennas and may be configured to use the antennas to transmit and/or receive directional wireless signals (e.g., beams). Similarly, a BS 102 may also include any number of antennas and may be configured to use the antennas to transmit and/or receive directional wireless signals (e.g., beams). To receive and/or transmit such directional signals, the antennas of the UE 106 and/or BS 102 may be configured to apply different "weight" to different antennas. The process of applying these different weights may be referred to as "precoding".

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

In some embodiments, UE 106 may communicate (e.g., concurrently) with multiple BS 102*s*. One or more BS 102*s* may make up a radio access network (RAN).

Figure 3:
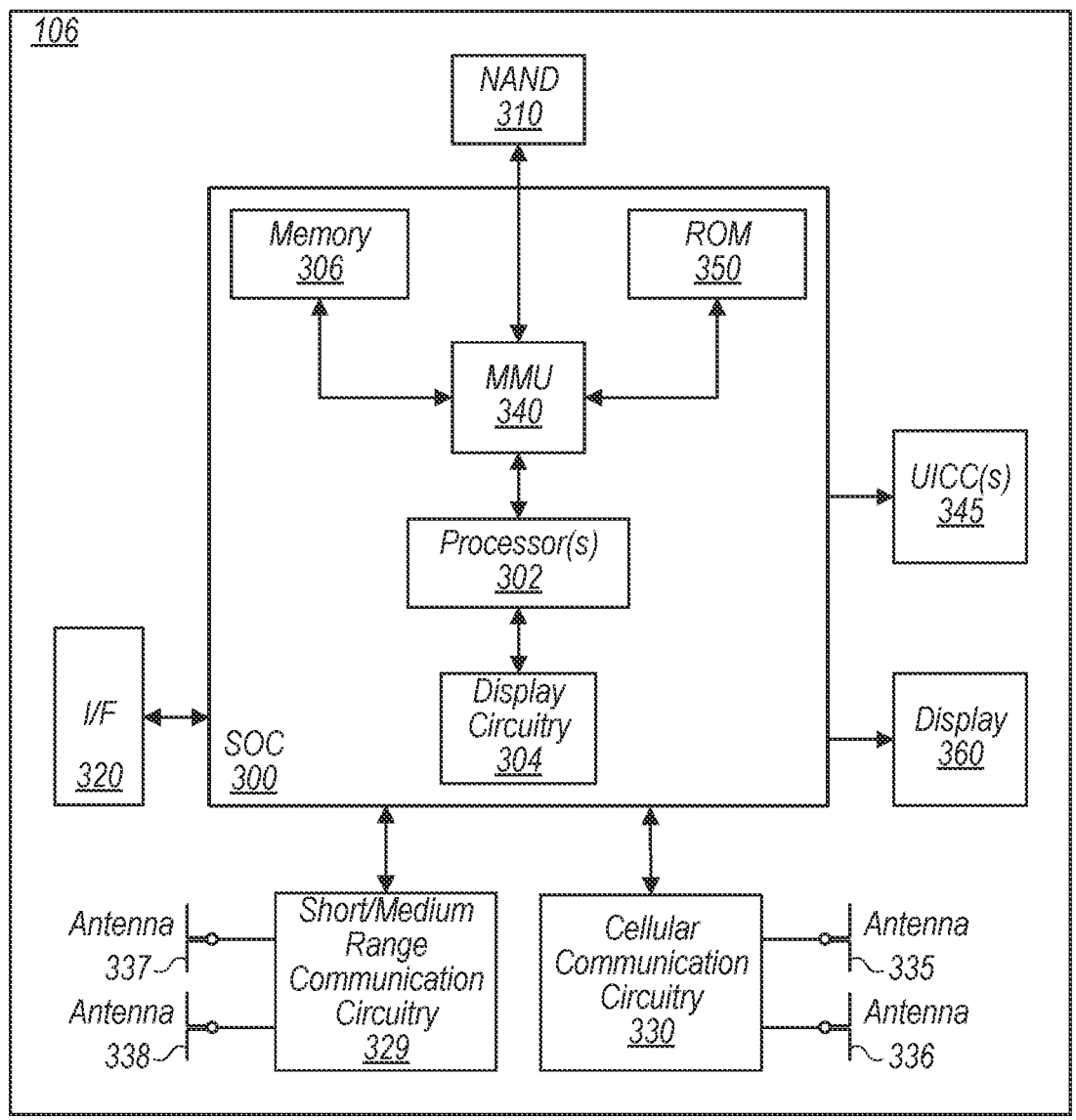
FIG. 3 illustrates an example block diagram of a UE, according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively, directly or indirectly, dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to transmit a request to attach to a first network node operating according to the first RAT and transmit an indication that the wireless device is capable of maintaining substantially concurrent connections with the first network node and a second network node that operates according to the second RAT. The wireless device may also be configured transmit a request to attach to the second network node. The request may include an indication that the wireless device is capable of maintaining substantially concurrent connections with the first and second network nodes. Further, the wireless device may be configured to receive an indication that dual connectivity (DC) with the first and second network nodes has been established.

As described herein, the communication device 106 may include hardware and software components for implementing features for using multiplexing to perform transmissions according to multiple radio access technologies in the same frequency carrier (e.g., and/or multiple frequency carriers), as well as the various other techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements and/or processors. In other words, one or more processing elements or processors may be included in cellular communication circuitry 330 and, similarly, one or more processing elements or processors may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 330. Similarly, the short range wireless communication circuitry 329 may include one or more ICs that are configured to perform the functions of short range wireless communication circuitry 329. In addition, each integrated circuit may include circuitry (e.g., first circuitry, second circuitry, etc.) configured to perform the functions of short range wireless communication circuitry 329.

Figure 4:
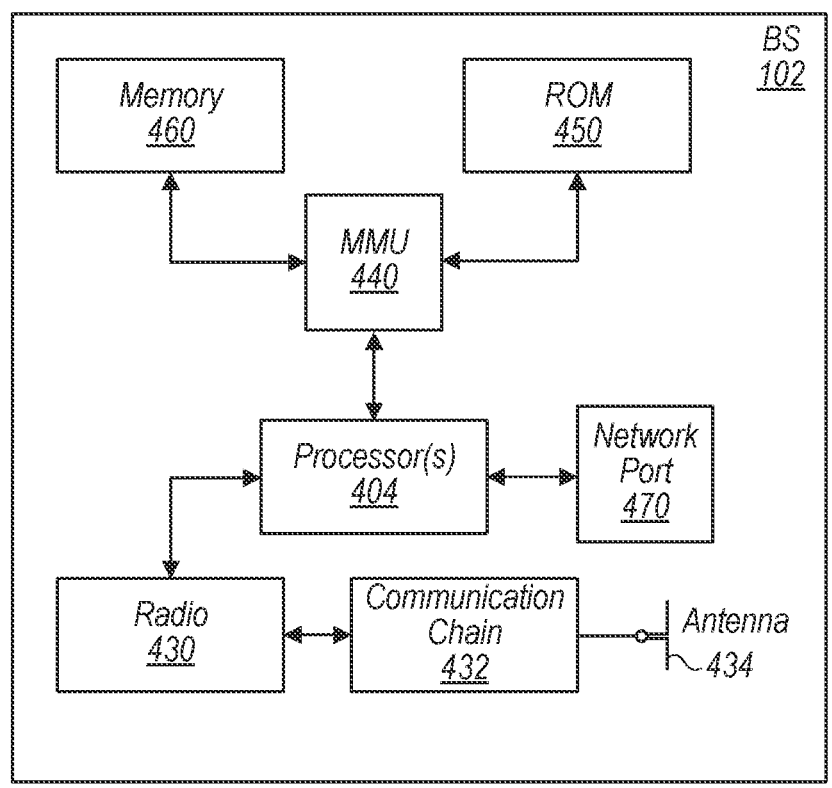
FIG. 4 illustrates an example block diagram of a BS, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNB s.

The base station 102 may include at least one antenna 434, and possibly multiple antennas. The radio 430 and at least one antenna 434 may be configured to operate as a wireless transceiver and may be further configured to communicate with UE devices 106. The antenna 434 may communicate with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

In some embodiments, a BS 102 may provide access to a cellular network via a 3GPP access and/or a non-3GPP access. In some embodiments, a BS 102 that provides a non-3GPP access may be referred to as an access point.

Figure 5:
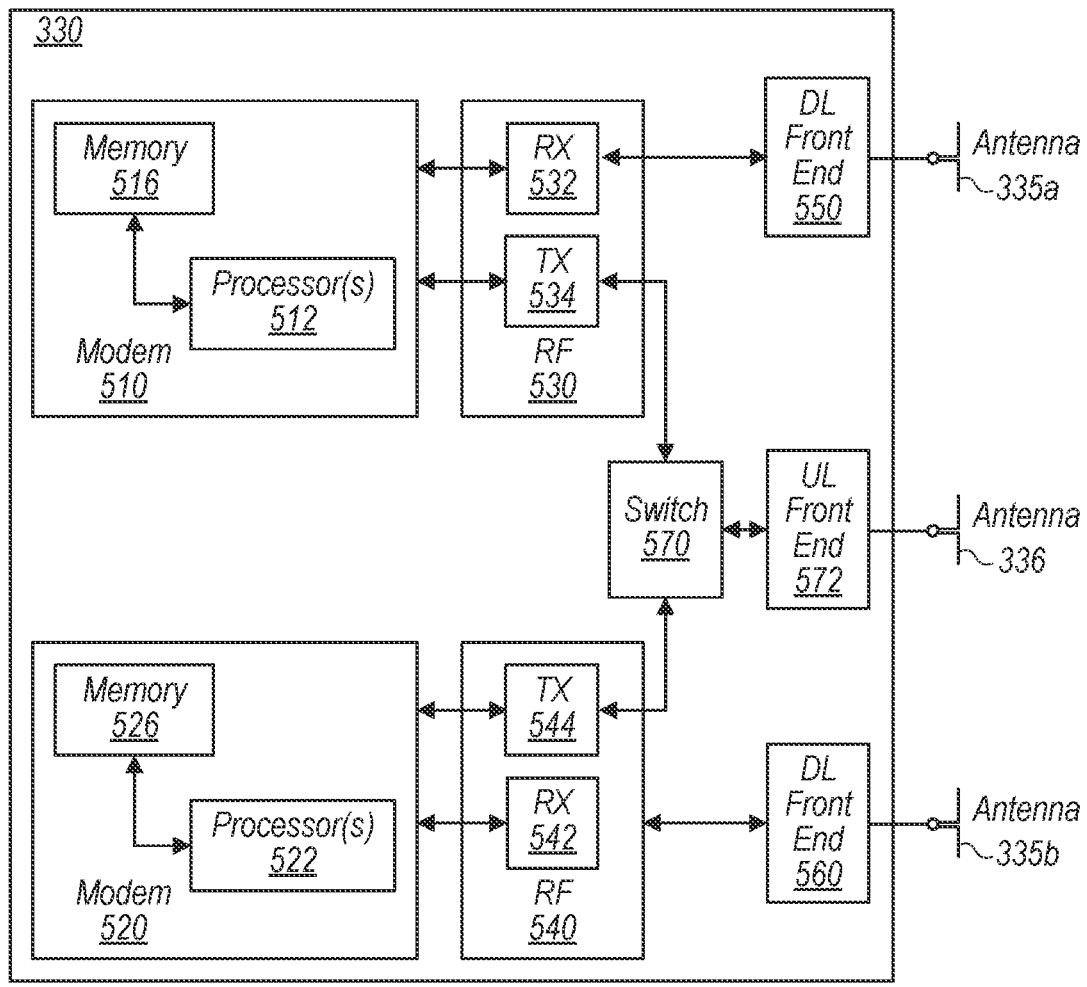
FIG. 5 illustrates an example block diagram of cellular communication circuitry, according to some embodiments.

FIG. 5—Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, are also possible. According to embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown (in FIG. 3). In some embodiments, cellular communication circuitry 330 may include dedicated receive chains (including and/or coupled to, e.g., communicatively, directly or indirectly, dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch (e.g., and/or combiner, multiplexer, etc.) 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, modem 510 and modem 520 may be configured to transmit at the same time, receive at the same time, and/or transmit and receive at the same time. Thus, when cellular communication circuitry 330 receives instructions to transmit according to both the first RAT (e.g., as supported via modem 510) and the second RAT (e.g., as supported via modem 520), combiner 570 may be switched to a third state that allows modems 510 and 520 to transmit signals according to the first and second RATs (e.g., via a transmit circuitry 534 and 544 and UL front end 572). In other words, the modems may coordinate communication activity, and each may perform transmit and/or receive functions at any time, as desired.

In some embodiments, the cellular communication circuitry 330 may be configured to transmit, via the first modem while the switch is in the first state, a request to attach to a first network node operating according to the first RAT and transmit, via the first modem while the switch is in a first state, an indication that the wireless device is capable of maintaining substantially concurrent connections with the first network node and a second network node that operates according to the second RAT. The wireless device may also be configured transmit, via the second radio while the switch is in a second state, a request to attach to the second network node. The request may include an indication that the wireless device is capable of maintaining substantially concurrent connections with the first and second network nodes. Further, the wireless device may be configured to receive, via the first radio, an indication that dual connectivity with the first and second network nodes has been established.

As described herein, the modem 510 may include hardware and software components for implementing features for using multiplexing to perform transmissions according to multiple radio access technologies in the same frequency carrier, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In some embodiments, processor(s) 512, 522, etc. may be configured to implement or support implementation of part or all of the methods described herein, e.g., by executing program instructions stored on a memory medium (e.g., a non-transitory computer-readable memory medium). Alternatively, the processor(s) 512, 522, etc. may be configured as a programmable hardware element, such as an FPGA, or as an ASIC, or a combination thereof. In addition, as described herein, processor(s) 512, 522, etc. may include one or more processing elements. Thus, processor(s) 512, 522, etc. may include one or more integrated circuits (ICs) that are configured to perform the functions of processor(s) 512, 522, etc. In addition, each integrated circuit may include circuitry (e.g., first circuitry, second circuitry, etc.) configured to perform the functions of processor(s) 512, 522, etc.

As described herein, the modem 520 may include hardware and software components for implementing features for using multiplexing to perform transmissions according to multiple radio access technologies in the same frequency carrier, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

Figure 6:
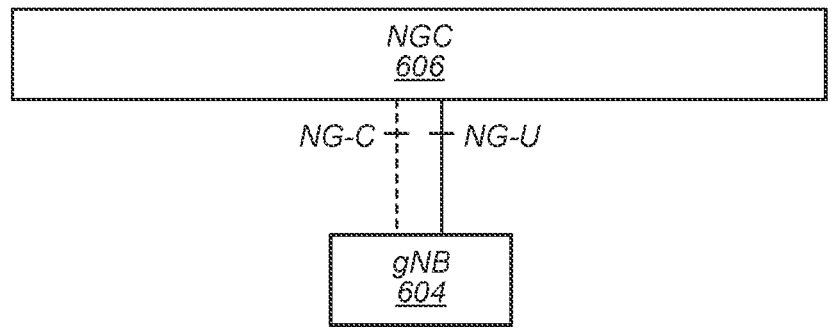
FIGS. 6 and 7 illustrate examples of a 5G NR base station (gNB), according to some embodiments.
Figure 7:
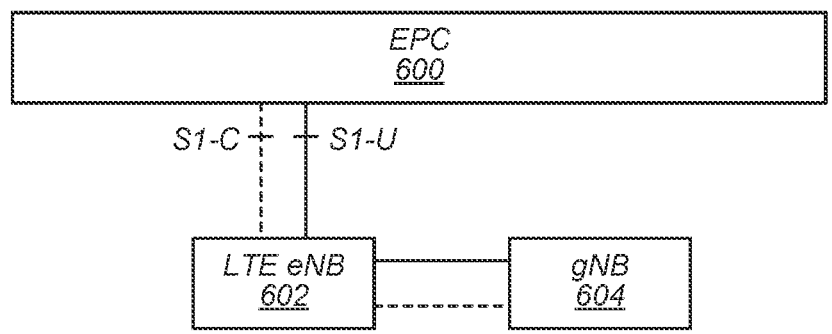

FIGS. 6-7—5G NR Architecture

In some implementations, fifth generation (5G) wireless communication will initially be deployed concurrently with other wireless communication standards (e.g., LTE). For example, whereas FIG. 6 illustrates a possible standalone (SA) implementation of a next generation core (NGC) network 606 and 5G NR base station (e.g., gNB 604), dual connectivity between LTE and 5G new radio (5G NR or NR), such as in accordance with the exemplary non-standalone (NSA) architecture illustrated in FIG. 7, has been specified as part of the initial deployment of NR. Thus, as illustrated in FIG. 7, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. In some instances, the gNB 604 may also have at least a user plane reference point with EPC network 600. Thus, EPC network 600 may be used (or reused) and gNB 604 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services. As will be appreciated, numerous other non-standalone architecture variants are possible.

Capability Update

A UE may have capabilities to communicate in a variety of manners, e.g., according to one or more RATs (e.g., various cellular RATs including NR, LTE, etc. and/or non-cellular RATs such as a wireless local area network (WLAN), e.g., Wi-Fi or 802.11), using various frequencies or combinations of frequencies, with various features enabled or disabled, according to various power classes, etc. Thus, a UE's radio capability information may contain relevant information on RF capabilities and/or other capabilities that the UE supports (e.g., RATs, power class, frequency bands, supported carrier aggregation combinations, supported modulation schemes (e.g. 64QAM, 256QAM) etc.). Consequently, this information can be sufficiently large that it may be undesirable to send it across the radio interface, e.g., at every transition of a UE's connection management (CM) state from idle to connected.

In 5G (e.g., according to 5G NR) a UE may connect to a 5G core of a cellular network (e.g., a public land mobile network) via cellular access(es) and/or non-cellular access (es). A cellular access may be referred to as a $3^{rd}$ Generation Policy Partnership (3GPP) access, and a non-cellular access may be referred to as a non-3GPP access. A non-3GPP access may operate according to a wireless local area network (WLAN) standard, e.g., Wi-Fi or 802.11.

Within the 5G core, a non-3GPP interworking function (N3IWF) may connect the non-3GPP access(es) to other core network elements. A network function, e.g., an access and mobility management function (AMF), may store information on UE radio capabilities and may maintain such information across state transitions (e.g., CM_IDLE where the UE does not have a radio connection to or from CM_CONNECTED transitions). Thus, when a UE establishes a connection, the AMF may include the last received UE capabilities as part of a message (e.g., INITIAL CONTEXT SETUP REQUEST or other message sent over the N2) sent to the radio access network (RAN). The RAN may store the UE radio capability information (e.g., received in an N2 message from the core network or obtained from the UE, etc.) for the duration of the UE staying in a radio resource control (RRC) connected or RRC inactive state with respect to the RAN (e.g., a cellular/3GPP access).

A UE's capability may include various features such as: RAT support, frequency band support, feature support (e.g., to operate and perform actions such as reselection within a closed subscriber group (CSG); features related to self organizing networks (SON) such as minimization of drive tests, random access channel (RACH) reports, radio link failure reports, etc.; support for various measurement reports such as A1, A2, etc.), etc. Among various possibilities, a UE may provide its capability to network as part of initial registration, e.g. using a 3GPP access. A UE may need to update its radio capability due to any of various reasons or triggers e.g., thermal conditions at the UE such as high temperatures leading to reduced ability to transmit on one or more bands, change of location, change of user preference such as a user disabling a RAT or other feature via a user interface (UI), etc. Regarding capability updates, 3GPP TS 23.501 notes:

"If a UE's next generation (NG)-RAN UE radio capability information changes while in CM-idle state, the UE may perform the registration procedure with the registration type set to mobility registration update and indicating UE radio capability update; and "If the trigger to change the UE's NG-RAN UE radio capability information happens when the UE is in CM-connected state (which includes RRC inactive and RRC connected), the UE shall first enter CM-idle state and then perform the registration procedure with the registration type set to mobility registration update and indicating UE radio capability update."

Thus, in some embodiments, 3GPP may require that a UE be in (or enter) CM-idle prior to updating its UE capability information regarding the 3GPP access, e.g., NG-RAN.

A radio capability update may or may not affect an ongoing RRC connection in case the update is done in an RRC connected state. For example, not all the UE radio capabilities may apply to the ongoing RRC/CM connection. For example, a UE may be RRC connected on an NR cell, and as part of the radio capability update, the UE may disable 2G/3G RAT support based on a user disabling these RATs via a UI. In such an example, the capability update may cause the UE to enter CM idle, thus potentially interrupting 5G NR activity, even though the RATs being disabled are not in use. In other words, this may lead to an interruption of a RAT that is currently in use in order for the UE to update capabilities about a currently unused RAT (or other currently unused feature). However, in some other cases, it may be possible that the UE capability update affects the ongoing cellular connection in case the UE capability update is done in a CM-connected state. For example, a carrier aggregation (CA) combination such as CA_2A_4A may be configured by the UE, and as part of radio capability update, a UE may disable band 4. Thus, the CA_2A_4A may be replaced by another CA combination, or a network may downgrade the UE to operate in a single band Some implementations of updating capability information may be associated with various disadvantages. Several examples are described below.

If a UE is in a CM idle state over a 3GPP access, it may incur one or more additional RRC and/or non-access stratum (NAS) signaling message(s) in order to update the radio capability via the 3GPP access. This may be a power draining operation, e.g., especially when the cellular signal conditions are poor.

Manufacturer-assigned capability identifier (ID) and cellular public land mobile network (PLMN) assigned capability ID are two IDs introduced in 3GPP R16, which may be used to indicate a UE's capability with a short ID instead of the entire capability information (e.g., which may be up to 32 KB in size, in some examples). The manufacturer-assigned ID may not be a preferred deployment option due to maintenance overhead (e.g., requirements for coordination between numerous UE manufacturers and PLMNs) and may not be widely implemented. Therefore, a UE may send out the entire capability during a first registration with a PLMN, the PLMN may then assign a PLMN-assigned ID. Various problems are foreseen for a UE to send such a big message (e.g., a 32 KB capability string) using uplink radio resources, especially in challenging radio conditions. For example, the UE may have difficulty performing a large upload under some conditions, such as congested networks, high mobility/rapid movement of the UE, limited transmit power, cell edge conditions, etc. Thus, even though transmitting a full capability string may be undesirable, it may occur in many initial registrations, e.g., because a manufacturer assigned ID is not available or not supported.

If a UE is in a CM connected (e.g., RRC-inactive or RRC-connected) state, the UE may, according to current 3GPP specifications, as discussed above, transition to CM-idle (and thus RRC-idle) before updating the radio capability. This means a UE implementation may have two options if the trigger to update UE capability occurs when in RRC-connected state.

As one possibility, a UE may immediately transition from CM-Connected to CM-idle and RRC-idle and update the radio capability to the PLMN. This may lead to potential call drops in scenarios where a voice (e.g., VoLTE, etc.) call is ongoing and a trigger the UE to update UE capability occurs (e.g., due to thermal reasons, etc.). Further, transitioning from RRC-inactive to RRC-idle in order to update radio capability may cause the UE to lose the advantages of staying in RRC-inactive (e.g., preservation of security, bearer, measurement context, etc.).

As another possibility, the UE may wait until the UE completes its ongoing activity in CM-connected state, and may update the radio capability only once the UE has transitioned to CM-idle state. However, the UE may be in CM-connected with an RRC-inactive state for very long durations of time (e.g., on the order of minutes). In such cases, there may be a significant delay in updating the radio capability to the PLMN.

Figure 8:
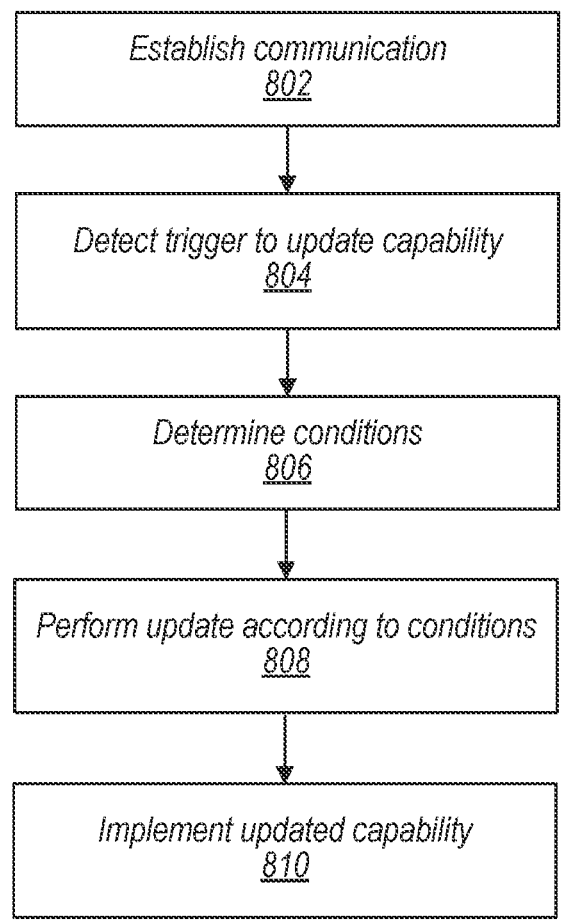
FIG. 8 illustrates an example method of capability update, according to some embodiments.
Figure 9:
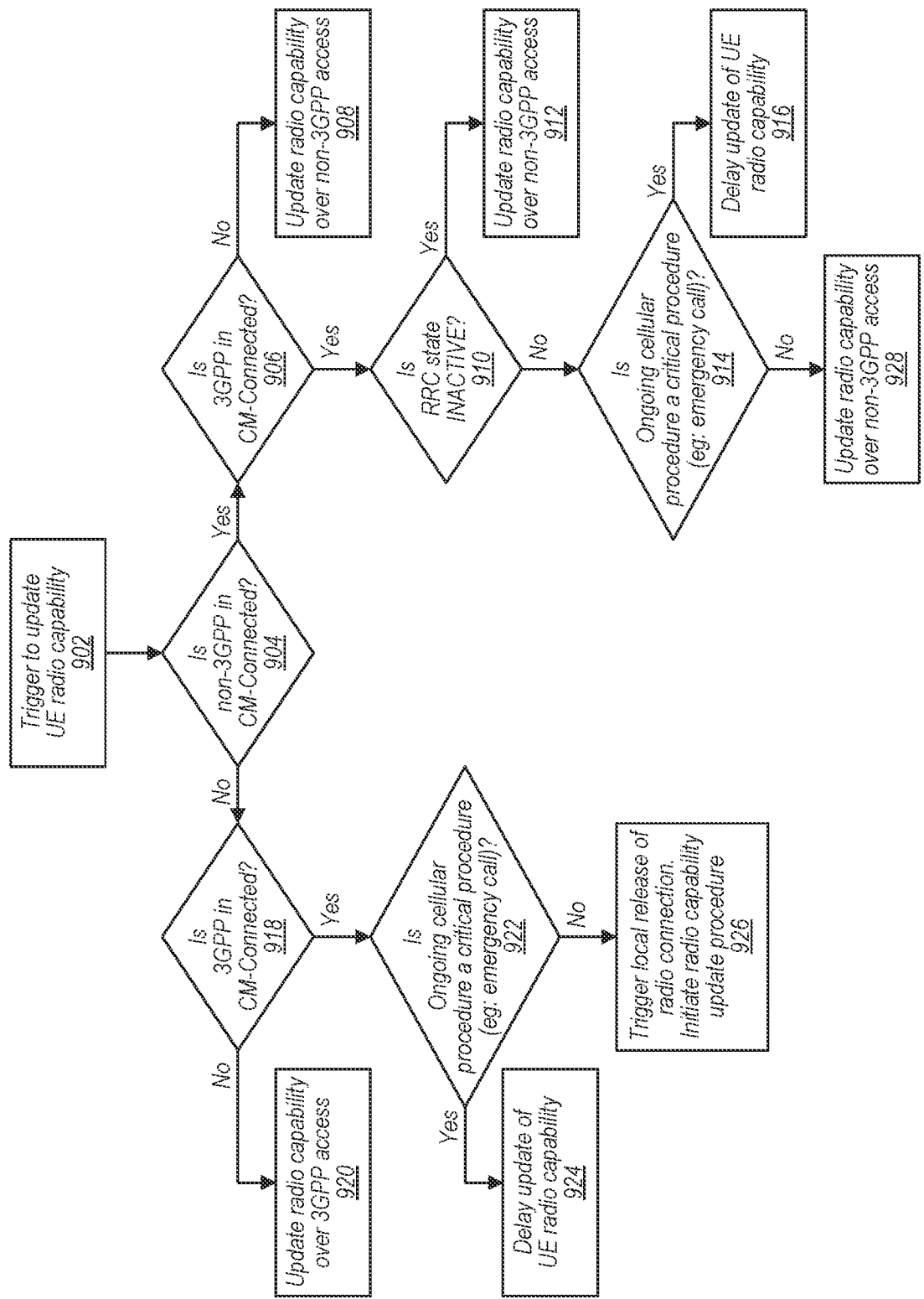
FIG. 9 illustrates an example method of capability update, according to some embodiments.

FIGS. 8 and 9—Capability Update

In some embodiments, the same AMF may serve a UE in cases when UE is registered over a 3GPP access and non-3GPP access on the same PLMN. In other words, a single AMF may be associated with both accesses. Since the AMF may be the node which maintains the UE radio capability, the non-3GPP access may be used to communicate the updated radio capability to the AMF, thus avoiding or mitigating some or all of the problems discussed above.

FIG. 8 is a flow chart diagram illustrating an example method of capability update, incorporating use of the non-3GPP access under some conditions. Aspects of the method of FIG. 8 may be implemented by a UE 106 in communication with a cellular PLMN (e.g., via 3GPP access and/or non-3GPP access, e.g., including one or more BS 102), as illustrated in and described with respect to the Figures, or more generally in conjunction with any of the computer circuitry, systems, devices, elements, or components shown in the Figures, among other devices, as desired. For example, a processor (or processors) of the UE (e.g., processor(s) 302, processor(s) associated with communication circuitry 329 or 330 such as processor(s) 512 and/or 522, etc.), base station (e.g., processor(s) 404, or a processor associated with radio 430 and/or communication chain 432, among various possibilities), or network element (e.g., any component of NGC 606, EPC 600, such as an AMF, N3IWF, etc.), may cause the UE, base station, and/or network element(s) to perform some or all of the illustrated method elements. For example, a baseband processor or application processor of the UE may cause the UE to perform some or all of the illustrated method elements. Note that while at least some elements of the method are described in a manner relating to the use of communication techniques and/or features associated with 3GPP specification documents, such description is not intended to be limiting to the disclosure, and aspects of the method may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method may operate as follows.

A UE 106 may establish communication with a network 100 (e.g. a PLMN, which may operate according to cellular standards such as NR) (802), according to some embodiments. The communication may include a 3GPP access and/or non-3GPP access. For example, a 3GPP access may be associated with a first frequency band (or set of bands) and/or a first radio of the UE (e.g., a cellular radio), and the non-3GPP access may be associated with a second frequency band (or set of bands) and a second radio of the UE (e.g., a WLAN radio, etc.). The access(es) may be associated with one or more base stations 102, e.g., one or more cellular and/or WLAN base stations 102. In some embodiments, a UE operating according to NR may connect to the 5G system via a non-3GPP (e.g., WLAN) access (e.g., connecting via an N3IWF to an AMF) as well as a 3GPP (e.g., cellular) access (e.g., connecting through a cellular RAN to the AMF). The cellular access may operate in licensed and/or unlicensed spectrum (e.g., according to NR-unlicensed). Establishing communication may include registering with the network via one or more access.

In some embodiments, an AMF may indicate to the UE whether radio capability update over non-3GPP access is supported. In other words, the AMF may transmit a message to the UE describing whether the UE is permitted to transmit radio capability updates over a non-3GPP access, or whether only a 3GPP access may be used for such updates. Such an indication may be provided as part of initial registration, e.g., over either access (or both accesses). In some embodiments, the indication may further describe conditions under which the non-3GPP access may be used and/or related procedures, etc.

The UE and the BS may communicate using one or more radio access technologies, e.g., NR. The UE and BS may exchange application and/or control data in the uplink and/or downlink directions. The communication and measurements may occur on any frequency or combination of frequencies, e.g., including licensed and/or unlicensed spectrum. The communication and measurements may continue (e.g., periodically, randomly, as needed, etc.) for any amount of time.

The UE 106 may detect a trigger to update its capability (e.g., radio capability, etc.) with the network 100 (804), according to some embodiments. The trigger (e.g., reason for initiating an update) may be based on any of various factors or measurements e.g., thermal conditions at the UE such as high temperatures leading to reduced ability to transmit on one or more bands, change of location (e.g., reduced signal strength or quality as determined by measurements), battery levels or other changes/restrictions in energy/power use, change of user preference such as a user disabling a RAT or other feature via a UI, change of network/PLMN, etc. In some embodiments, the network may send an indication to the UE to trigger/initiate a capability update.

The UE 106 may determine one or more conditions relevant to performing the capability update (806), according to some embodiments. Among various possibilities, the UE may determine: whether the non-3GPP access may be used for capability updates (e.g., according to the CM state (e.g., connected or idle, etc.) of each access; the RRC state (e.g., connected, inactive, or idle, etc.); and/or the nature of any ongoing communication activity on either or both access (e.g., type, level of importance, expected duration of a uplink or downlink data transfer, etc.). For example, determining the nature of ongoing communication activity on a 3GPP (e.g., cellular) access may be useful to determine the impact to the user experience associated with entering a CM idle state on a 3GPP access. Accordingly, on condition that the UE may determine is the level of importance of any ongoing activity using the 3GPP access. For example, the UE may determine whether a critical activity such as an emergency call is ongoing, and/or whether any other activity that may significantly degrade the user experience (e.g., a non-emergency voice or video call) is ongoing.

The UE 106 may perform the update according to the determined conditions (808), according to some embodiments. The UE 106 may determine updated capability information to provide to the network. The updated capability information may be based on the trigger for the update (e.g., reduced capability may be associated with thermal overload, changed capability may be based on changes in user preferences, etc.). The UE may generate a capability string describing the updated capability.

The UE may (e.g., if updates over non-3GPP access are permitted and the non-3GPP access is in a CM connected state) transmit the updated capability over the non-3GPP access. For example, the UE may update the radio capability payload via a NAS signaling procedure over non-3GPP access. In some embodiments, the UE may initiate a 5G registration procedure (e.g., via NAS message) over non-3GPP with a registration type set to mobility registration update and/or indicating a UE radio capability update. In some embodiments, the UE may send a NAS uplink message over non-3GPP having the updated radio capability. In some embodiments, the NAS uplink message may be associated with a new NAS procedure over non-3GPP (e.g., which may be introduced according to embodiments of this disclosure) to update the UE radio capability information.

The UE may (e.g., if non-3GPP access is not in CM-connected, and no critical procedure (e.g., emergency call, etc.) is ongoing over 3GPP access), transmit the updated capability over the 3GPP access. For example, the UE may locally release RRC-connection on 3GPP access, enter a CM-idle state on 3GPP access, and then update the UE radio capability using the 3GPP access after entering the CM-idle state on 3GPP access.

The UE may (e.g., if the 3GPP access is CM connected and RRC connected, but a communication activity (e.g., an emergency call) that may be significant to the user experience is ongoing) delay the capability update while the (e.g., critical) communication activity is ongoing. The UE may perform the capability update after the communication activity concludes. The UE may select an access for performing the capability update based on the prevailing conditions at the time the update is performed.

The UE 106, in coordination with the network 100 and BS 102 may implement the updated capability (810), according to some embodiments.

The AMF may, in response to receiving a capability update from the UE over a non-3GPP access take various actions. For example, the AMF may assign a PLMN-assigned ID to the UE and provide the ID to the UE over the non-3GPP access. The UE may then utilize the PLMN-assigned ID for subsequent registrations on 3GPP and/or non-3GPP access.

Also, in response to receiving a capability update from the UE over a non-3GPP access, the AMF may pass the updated UE radio capability to a 3GPP RAN (e.g., BS 102, which may provide a 3GPP access). For example, the AMF may provide the updated capability to the RAN via an N2 request or an N2 notify message. If the UE is in CM idle state over 3GPP access, the AMF may wait until initiation of the next subsequent RRC and/or CM connection in order to transfer the updated UE radio capability to the RAN. However, if the UE is in a CM connected state over 3GPP access, the AMF may (e.g., immediately, or without delaying for any change in state of the UE) provide the RAN with the updated radio capability received from the UE over non-3GPP access.

In response to receiving the updated capability information from the AMF (e.g., received by the AMF via the non-3GPP access), the 3GPP RAN may determine if the UE is in an RRC connected or RRC inactive state (e.g., in contrast to an RRC idle state) on the 3GPP access. If the UE is in RRC connected or RRC inactive state, the RAN may check if all of the capabilities activated for the current RRC connection are still supported by UE. If not, the RAN may send an RRC reconfiguration message to the UE in order to reconfigure the UE with features consistent with the updated configuration. For example, if the RAN/BS 102 has configured a first carrier aggregation (CA) configuration (e.g., a 5×CA combination), and as result of the radio capability update, the RAN learns that the UE now only supports lower CA configurations (e.g., a maximum of 3×CA), the RAN may initiate an RRC reconfiguration to select a new CA configuration. In such a scenario, the BS 102 may send an RRC reconfiguration message and remove the previously supported (e.g., 4th and 5th CA) configurations.

In scenarios where the RAN detects that the update in radio capability makes continuation of the existing RRC connection unfeasible, the BS 102 may release the RRC connection. For example, if the UE initiated a connection on NR band n71, and as part of updated radio capability, UE disables support for this band, then the BS may release the RRC connection. Such situations may occur due to thermal overloading at the UE and/or user selections of various features, among various possibilities.

In scenarios where the RAN detects that the update in radio capability may not impact the ongoing RRC connection in any way, the BS 102 may continue with the RRC connection, e.g., without initiating a reconfiguration.

The UE and the network may continue to communicate using either or both of the 3GPP and non-3GPP accesses. Further communications on the 3GPP access may be performed using the updated capability information, e.g., after the capability information is applied by the RAN. In some embodiments, the network (e.g., the AMF and/or RAN) may transmit an acknowledgement to the UE of a capability update provided to the network over the non-3GPP access. The acknowledgement may indicate to the UE at what time (or under what conditions) the capability update will be implemented by the RAN.

The method of FIG. 8 may provide various benefits. For example, a non-3GPP access may provide a lightweight option to update the radio capability for the UE, e.g., without incurring the additional NAS signaling or additional delay which would be incurred by utilizing the prior art mechanism to update the radio capability over 3GPP access. Further, in scenarios, where a UE is in a state configured to provide benefits for power use and/or latency (e.g., RRC inactive), the method of FIG. 8 may allow the UE maintain the benefit of being in this state (e.g., which would be lost by entering CM idle as in the prior art). Still further, in scenarios where no critical procedure is ongoing over 3GPP access, the non-3GPP access may be used for updating UE radio capability with no delay incurred.

FIG. 9 provides an example of aspects of the method of FIG. 8, according to some embodiments. In particular, FIG. 9 may be viewed as a flow chart corresponding to determining conditions (e.g., as in 806) and performing a capability update according to the conditions (e.g., as in 808). It will be appreciated that FIG. 9 is exemplary only, and that other manners of determining conditions and performing a capability update may be used as desired.

As shown, a UE may detect a trigger to update the radio capability (902), e.g., as discussed above with respect to 804. The UE may determine whether a non-3GPP access is in a CM-connected state (904).

If the non-3GPP access is CM connected, the UE may determine if the 3GPP access is CM connected (906). If not, the UE may update its capability over non-3GPP access (908).

If the 3GPP access is CM connected, the UE may determine if the RRC state (e.g., of the 3GPP access) is inactive (910). If the RRC state is inactive, the UE may update its capability over non-3GPP access (912). Accordingly, the RRC state of the 3GPP access may remain in an inactive state.

If the RRC state is not inactive, the UE may determine whether any communication ongoing on the 3GPP access is critical (e.g., should not be delayed, such as an emergency call, or possibly a generic voice call, among various possibilities) (914). If a critical procedure is ongoing using the 3GPP access, the UE may delay the capability update while the critical procedure is ongoing (916). If no critical procedure is ongoing, the UE may update its capability over non-3GPP access (928).

If the non-3GPP access is not connected (e.g., as determined in 904), the UE may determine if the 3GPP access is CM connected (918). If not, the UE may update its capability over 3GPP access (920).

If the 3GPP access is CM connected, the UE may determine whether any communication ongoing on the 3GPP access is critical (922) (e.g., as described above for 914). If a critical procedure is ongoing using the 3GPP access, the UE may delay the capability update while the critical procedure is ongoing (924). If no critical procedure is ongoing, the UE may update its capability over 3GPP access (926), e.g., by releasing the RRC connection (e.g., associated with the 3GPP access) and initiating a capability update procedure (e.g., over the 3GPP access).

ADDITIONAL INFORMATION AND EXAMPLES

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus comprising:
a processor configured to cause a user equipment device (UE) to:
register with a cellular public land mobile network (PLMN) using both a 3GPP and a non-3GPP access;
detect a trigger to provide an updated radio capability;
in response to detecting the trigger to provide the updated radio capability, determine if one of these conditions is true:
the non-3GPP access is in a connection management (CM)-connected state and the 3GPP access is not in the CM-connected state; or
the non-3GPP access is in the CM-connected state, the 3GPP access is in the CM-connected state, and a critical procedure is not ongoing; and
based on the determination:
if one of the conditions is true, provide, to the cellular PLMN, the updated radio capability, wherein the updated radio capability is provided during a registration procedure using the non-3GPP access; and
otherwise, perform one or more of:
delay providing, to the cellular PLMN, the updated radio capability; or
provide, to the cellular PLMN, the updated radio capability, using the 3GPP access.

2. The apparatus of claim 1, wherein a type of the registration procedure is set to mobility registration update.

3. The apparatus of claim 1, wherein a type of the registration procedure indicates a UE radio capability update.

4. The apparatus of claim 1, wherein the processor is further configured to cause the UE to:
receive, from the cellular PLMN an indication that radio capability updates over the non-3GPP access are supported, wherein providing the updated radio capability is based on the indication.

5. The apparatus of claim 1, wherein the processor is further configured to cause the UE to: receive, from the cellular PLMN, a cellular PLMN-assigned identifier, wherein the cellular PLMN-assigned identifier is received over the non-3GPP access, wherein the registration procedure comprises using the cellular PLMN-assigned identifier.

6. The apparatus of claim 1, wherein the updated radio capability relates to the 3GPP access.

7. The apparatus of claim 1, wherein the updated radio capability relates to a change in next generation (NG)-radio access network UE radio capability information.

8. A user equipment device (UE), comprising:
a radio; and
a processor operably coupled to the radio and configured to cause the UE to:
  register with a cellular public land mobile network (PLMN) using both a 3GPP and a non-3GPP access;
  detect a trigger to provide an updated radio capability;
  in response to detecting the trigger to provide the updated radio capability, determine if one of these conditions is true:
    the non-3GPP access is in a CM-connected state and the 3GPP access is not in the CM-connected state; or
    the non-3GPP access is in the CM-connected state, the 3GPP access is in the CM-connected state, and a critical procedure is not ongoing; and
  based on the determination:
    if one of the conditions is true, provide, to the cellular PLMN, the updated radio capability, wherein the updated radio capability is provided during a registration procedure using the non-3GPP access; and
    otherwise, perform one or more of:
      delay providing, to the cellular PLMN, the updated radio capability; or
      provide, to the cellular PLMN, the updated radio capability, using the 3GPP access.

9. The UE of claim 8, wherein, based on determinations that the non-3GPP access is not in the CM-connected state and the 3GPP access is not in the CM-connected state, the processor is further configured to cause the UE to provide the updated radio capability using the 3GPP access.

10. The UE of claim 8, wherein, based on determinations that the non-3GPP access is not in the CM-connected state and the 3GPP access is in the CM-connected state, the processor is further configured to cause the UE to determine whether an ongoing procedure is critical.

11. The UE of claim 10, wherein, in response to a determination that the ongoing procedure is not critical, the processor is further configured to cause the UE to trigger a release of a connection associated with the 3GPP access and providing the updated radio capability over the 3GPP access.

12. The UE of claim 8, wherein, based on determinations that the non-3GPP access is in the CM-connected state and the 3GPP access is in the CM-connected state, the processor is further configured to cause the UE to determine whether a radio resource control (RRC) state is inactive.

13. The UE of claim 8, wherein the UE remains in an inactive radio resource control (RRC) state while the updated radio capability is provided.

14. A method for operating an access and mobility management function (AMF) of a cellular public land mobile network (PLMN), the method comprising:
at the AMF:
  registering a user equipment device (UE) using both a 3GPP access and a non-3GPP access;
  receiving, via the non-3GPP access, updated radio capability information from the UE;
  transmitting, to a base station of the cellular PLMN, the updated radio capability information;
  assigning a new capability identifier to the UE based on the updated radio capability information; and
  transmitting, to the UE, the new capability identifier using the non-3GPP access.

15. The method of claim 14, the method further comprising:
determining whether the UE is in a connection management (CM)-connected state over 3GPP access.

16. The method of claim 15, wherein, in response to a determination that the UE is in the CM-connected state, said transmitting is performed without delay.

17. The method of claim 15, wherein, in response to a determination that the UE is not in the CM-connected state, the method further comprises:
waiting until the UE enters the CM-connected state, wherein said transmitting is performed after the UE enters the CM-connected state.

18. The method of claim 14, the method further comprising:
at a subsequent time, receiving a registration from the UE using the 3GPP access, wherein the registration uses the new capability identifier.

19. The method of claim 14, wherein the UE remains in an inactive radio resource control
(RRC) state while the updated radio capability information is received.

* * * * *